March 15, 1932.    C. D. SPRACHER ET AL    1,849,337

CATHEAD PULLEY

Filed March 19, 1928

INVENTORS
CLIFFORD D. SPRACHER
ALTON M. REID
BY
H. A. Druckman
Attorney

Patented Mar. 15, 1932

1,849,337

UNITED STATES PATENT OFFICE

CLIFFORD D. SPRACHER, OF LONG BEACH, AND ALTON M. REID, OF WHITTIER, CALIFORNIA

CATHEAD PULLEY

Application filed March 19, 1928. Serial No. 262,793.

This invention relates to an automatic cat head pulley particularly useful in the drawing works of an oil well although it also might be used in other places.

An object of our invention is to provide a cat head pulley with clutch means so that it can be rotated with, or may idle upon the drive shaft.

Another object is to provide a cat head which can be secured to and rotate with the drive shaft if desired.

Still another object is to provide a cat head which can be readily attached to the end of the usual drive shaft.

An advantage of our cat head resides in the fact that it is mounted on anti-frictional bearings, thus rotating evener and being more effective in operation.

A further advantage resides in the releasable clutch so that the cat head may rotate freely or with the drive shaft if desired.

Other objects, advantages, and features of invention may appear in the accompanying drawings, the subjoined detailed descriptions, and the appended claims.

In the drawings—

Figure 1:
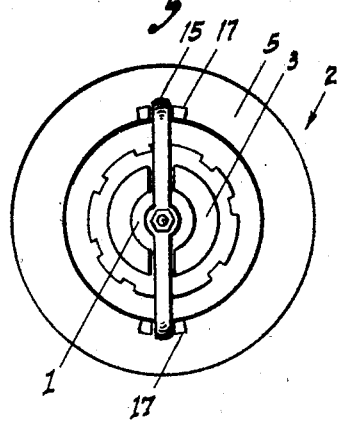
Fig. 1 is an end view of the cat head pulley.
Figure 2:
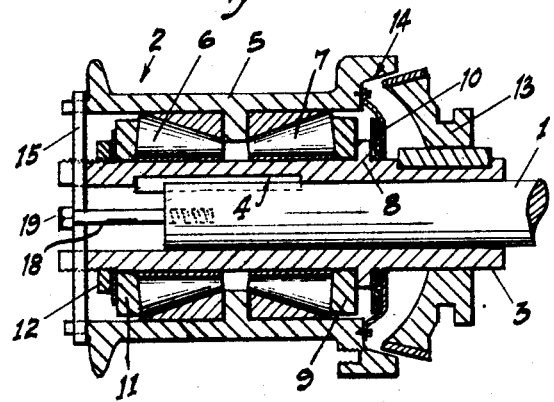
Fig. 2 is a longitudinal sectional view of the same.
Figures 3, 4:
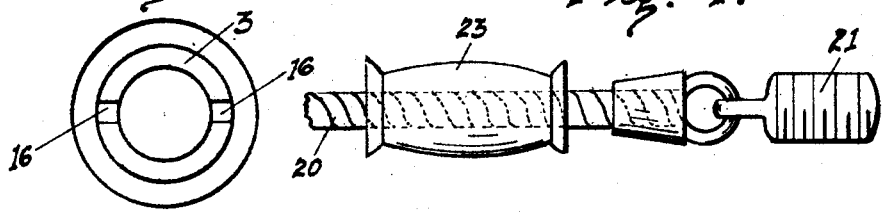
Fig. 3 is an end view of the cat head mounting sleeve.
Fig. 4 is a fragmentary side elevation of the cable and mounting means.
Figure 5:
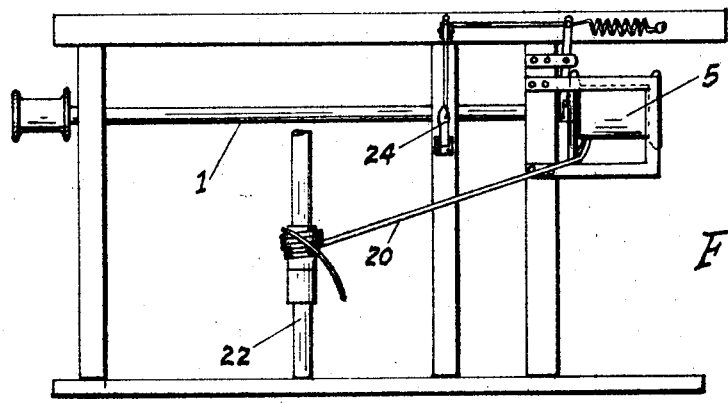
Fig. 5 is a perspective view of our cat head in operative position.

Referring more particularly to the drawings, the numeral 1 indicates the usual drive shaft upon the end of which our cat head pulley 2 is mounted. A mounting sleeve 3 fits onto the end of the shaft 1, and is non-rotatably held thereon by a suitable key 4.

A drum 5 comprises the reel upon which the cable, rope or the like is wound, and this drum is mounted upon anti-frictional bearings 6, 7, which bearings are positioned between the drum and the sleeve 3. While we have shown these bearings as of the tapered roller type, any other suitable design may be employed.

A shoulder 8 is provided on the sleeve 3, and a ring 9 fits against the shoulder and against the bearing 7 to hold said bearing in position. A felt washer 10 fits against the outside of the shoulder 8 and is secured at its outer edge to the drum 5, thus preventing any grease, oil, etc., from entering the frictional clutch, as will be further described.

The bearing 6 is held in position by a ring 11 against which a nut 12 is screwed. The nut 12 is held against rotation by suitable means of any desirable type.

A movable clutch member 13 is slidably keyed to the sleeve 3, and this clutch member engages one end of the drum 5, which end is recessed as at 14 to receive the clutch. While we have shown the clutch member as of the comb type, we may use a disc type or other suitable clutch. It is desirable at times that the drum 5 rotate with the shaft 1 without the use of the clutch 13, and for this purpose we employ a key 15 which fits into notches 16, 16, in the sleeve 3 and fits between lugs 17, 17, formed on the end of the drum 5.

A bolt 18 screws into the end of the shaft 1, and a nut 19 on the bolt screws against the key 15, thus holding the key in position and non-rotatably holding the drum on the sleeve.

In cat heads heretofore in use it has been found unpractical to use wire cables, but with our cat head, the wire cable 20 is permanently secured at one end thereof to the drum 5 by a threaded plug 21 which screws into the drum. The other end of the cable extends to the pipe 22 to operate upon the same as may be desired.

A tubular hand hold 23 is provided through which the cable 20 extends to properly feed the cable upon the drum. Any desirable operating means 24 may be provided to actuate the clutch 13 and cause the drum to rotate.

Having described our invention, we claim:

1. A cat head pulley adapted to be mounted on a shaft, and comprising a sleeve fitting upon the shaft, means securing the sleeve to the shaft, a drum, anti-friction bearings between the drum and sleeve, a key, means on the sleeve engageable by the key, and means on the drum engageable by the key, and means holding said key into engagement with both the aforesaid means whereby the drum is held against rotation relative to said sleeve.

2. A cat head pulley adapted to be mounted on a shaft, and comprising a sleeve fitting upon the shaft, means securing the sleeve to the shaft, a drum, anti-friction bearings between the drum and sleeve, a key, said sleeve having slots in the end thereof into which the key is adapted to fit, lugs on the drum between which the key is adapted to rest, and a bolt extending through the key into the end of the shaft whereby said key is held in operative position to hold said drum against rotation relative to the sleeve.

In testimony whereof, we affix our signatures.

CLIFFORD D. SPRACHER.
ALTON M. REID.